United States Patent [19]

Mader

[11] Patent Number: 5,690,501

[45] Date of Patent: Nov. 25, 1997

[54] ELECTRICAL POWER TRANSFER FOR ¾" OFFSET PIVOTS

[75] Inventor: Gerald E. Mader, Indianapolis, Ind.

[73] Assignee: Von Duprin, Inc., Indianapolis, Ind.

[21] Appl. No.: 578,298

[22] Filed: Dec. 26, 1995

[51] Int. Cl.$^6$ ..................................................... H01R 3/00
[52] U.S. Cl. .............................................. 439/165; 16/223
[58] Field of Search ..................... 439/31, 165; 16/223

[56] References Cited

U.S. PATENT DOCUMENTS

| | | | |
|---|---|---|---|
| 3,848,361 | 11/1974 | Foster et al. | 439/31 |
| 4,445,299 | 5/1984 | Lehikoinen et al. | 439/31 |

*Primary Examiner*—Gary F. Paumen
*Attorney, Agent, or Firm*—Robert F. Palermo; Michael H. Minns

[57] ABSTRACT

An apparatus for providing an electrical connection from a power source, through a stationary door frame, into a door to connect to door-mounted electrically-operated hardware, includes an electrical junction box installed in a mortise cavity in the door frame adjacent to a similar electrical junction box installed in a mortise cavity in an edge of the door. The junction boxes are adjacent each other when the door is in a closed position; and a housing is installed in each junction box, each housing having a longitudinal slot in a face plate thereof of a length substantially equal to the length of the junction box. A cover plate is longitudinally slidably engaged in grooved fingers on a rear surface of the face plate, the cover plate having a substantially circular hole. A hollow tube, having an elbow swivelably mounted on each end, has one elbow swivelably engaged in the substantially circular hole of the cover plate of the housing mounted in the door frame and the other elbow swivelably engaged in the substantially circular cover plate of the housing mounted in the door. A conductor cable connected to a power source, in the junction box mounted in the door frame, extends through the elbows and the hollow tube into the junction box mounted in the door, and connects to leads to door hardware mounted in or on the door.

3 Claims, 9 Drawing Sheets

ELECTRICAL POWER TRANSFER FOR ¾" OFFSET PIVOTS

BACKGROUND OF THE INVENTION

This invention relates generally to electrically active door hardware and more particularly to door hinges providing electrical connection between power source leads in the wall in which the door frame is mounted and the door-mounted hardware.

As a door opens, the distance between points on the door, at the hinged side, and on the door frame increases due to movement of the door away from the door frame. Consequently there is a need for a mechanism which allows an electrical wire between the door frame and the door to accommodate this movement without stretching. Electrical power transfers (EPT)s are provided for this purpose. Either a butt hinge or an offset hinge application may require an EPT since both are commonly used in construction. FIGS. 1–6 illustrate the two types of hinges, for application with electrically active door hardware, and an EPT presently used in conjunction with both types of hinges.

The butt hinge in FIGS. 1 and 2 is shown without the EPT, for the sake of clarity, in order to illustrate the magnitude and direction of the change of distance between points on the door and the door frame when the door is opened or closed. The door 11 is mounted in the door frame 10 on hinges 12 which each have two butt plates 12' connected by a hinge pin 15. The door 11 has a mortise cavity 13, and the door frame 10 has a mortise cavity 14 to accommodate the EPT 30 shown in FIGS. 5 and 6 and described below. When the door is closed, the mortise cavities in the door and door frame are adjacent and facing each other. When the door is fully opened, they are spaced by a distance equal to twice the offset distance, parallel to the faces of the hinge plates, from the hinge pin 15 to the centers of the mortise cavities, and both cavities face the same direction.

FIGS. 3 and 4 show a similar arrangement for a door 21 mounted in a hollow steel frame 20 on offset pivot hinges 22. Here the door 21 is mounted in door frame 20 on hinges 22, which comprise hinge plate 22', mounted on the door frame 20, hinge plate 22", mounted on the door 21, and pivot pins 25, connecting the hinge plates 22', 22" and providing pivoting motion between the door and the door frame. Instead of mortise cavities, an electrical box 24 is mounted in the hollow frame 20, and an electrical box 23 is also mounted in the door 21. Boxes 23, 24 house the EPT 30 mechanism in the hollow door and door frame. In this case, the change of offset distance from the closed to the opened condition includes not only the distance parallel to the faces equal to twice the offset distance, parallel to the faces of the plates, from the pivot pin 25 to the centers of the electrical boxes, but also an additional offset, perpendicular to the faces, approximately equal to twice the perpendicular distance from the faces to the centers of the pivot pins. This added offset results from the pivot pin being centered about 3/10 off the door frame instead of being centered between the frame face and the door edge as shown in the butt hinged example, above.

EPTs currently in use are illustrated in FIGS. 5 and 6, in which FIG. 5 shows a partially sectional view of an EPT revealing several features of the device. The EPT 30 has a first end with an end cap 36 connected to an inner telescopic tube 31 and a second end with an end cap 37 connected to an outer telescopic tube 33. The inner and outer telescopic tubes are telescopically connected to permit twisting and stretching of the EPT in service. Each end cap 36, 37 has a strain relief insert 35 which grips a wire 34 running through the EPT. Wire 34 has a coiled portion within the telescoping tubes to accommodate the extension required for opening the door, and the strain relief inserts 35 restrict such extension to that coiled portion in order to protect the connections to wire leads made in the electrical boxes 24, 14 and 23, 13. FIG. 6 shows the EPT device 30 installed in cross-sectioned electrical boxes of a door and door frame.

The EPT already described is mounted in housings 43 and 44, which are mounted in electrical boxes 23, 13 and 24, 14, respectively. Hollow knuckle pivots 38 are fastened in the housings 43, 44 by snap rings 39 and are free to rotate with respect to the housing. The knuckle pivots 38 are attached to the end caps 36, 37 by hinge pins 32 which allow articulation of the end caps with respect to the knuckle pivots. The wire 34 enters from the door frame and exits to the door hardware through the knuckle pivots. Inside the EPT, it is clamped by the strain relief inserts 35 in the end caps. This clamping action sets up a localized fatigue site in the wire at each end of the device adjacent the strain relief insert.

In addition to the EPT just described, another approach uses an extension spring outer cable to accommodate the required stretching of the wire as the door opens. This design requires units of different lengths for different door openings. For instance, a door opening of 105° requires a unit of 12¼" length, while an opening of 180° requires a length of 20⅞". It is desired to keep the length as short as possible in order to minimize the cutout required in the door prep. A flexible cable known as the wire loop may also be used, but it has the disadvantage of being visible when the door is closed, which makes it vulnerable to vandalism and tampering.

One very important factor in use of EPTs is the expected life cycle for the assembly, i.e., the number of times the door can be opened and closed without mechanical or electrical failure. Fatigue of the wire due to the twisting and flexing that accompanies opening and closing of the door is the primary cause of electrical failure in the EPT described. The wider the door opens, the greater the flexure of the wire, and the more difficult it is to maintain adequate life in the unit. Currently, no EPT available minimizes the length of the unit, is totally concealed when the door is shut, is protected from vandalism, and will work with ¾" offset pivots opening to 180°. While one or more of the desired characteristics may be found in some EPTs, none offers all of them in one unit.

The foregoing illustrates limitations known to exist in present electrical power transfer units. Thus, it would clearly be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by an apparatus for providing an electrical connection from a power source, through a stationary door frame, into a door to connect to door-mounted electrically-operated hardware, including an electrical junction box installed in a mortise cavity in the door frame adjacent to a similar electrical junction box installed in a mortise cavity in an edge of the door, the junction boxes being adjacent each other when the door is in a closed position; a housing installed in each junction box, each housing having a longitudinal slot in a face plate thereof of a length substantially equal to the length of the junction box, and a cover plate longitudinally slidably engaged in grooved fingers on a rear surface of the face plate, the cover plate having a substantially circular hole; a hollow tube having an elbow swivelably mounted on each end, one elbow swivelably engaged in the substantially circular hole of the cover plate of the housing mounted in the door frame and the other elbow swivelably engaged in the substantially circular cover plate of the housing mounted in the door; and a conductor cable connected to a power source, in the junction box mounted in the door frame, extending through the elbows and said hollow tube into the junction box mounted in the door, and connected to leads to door hardware mounted in or on the door.

The foregoing and other aspects will become apparent from the following detailed description of the invention when considered in conjunction with the accompanying drawings.

DETAILED DESCRIPTION

Figure 1:
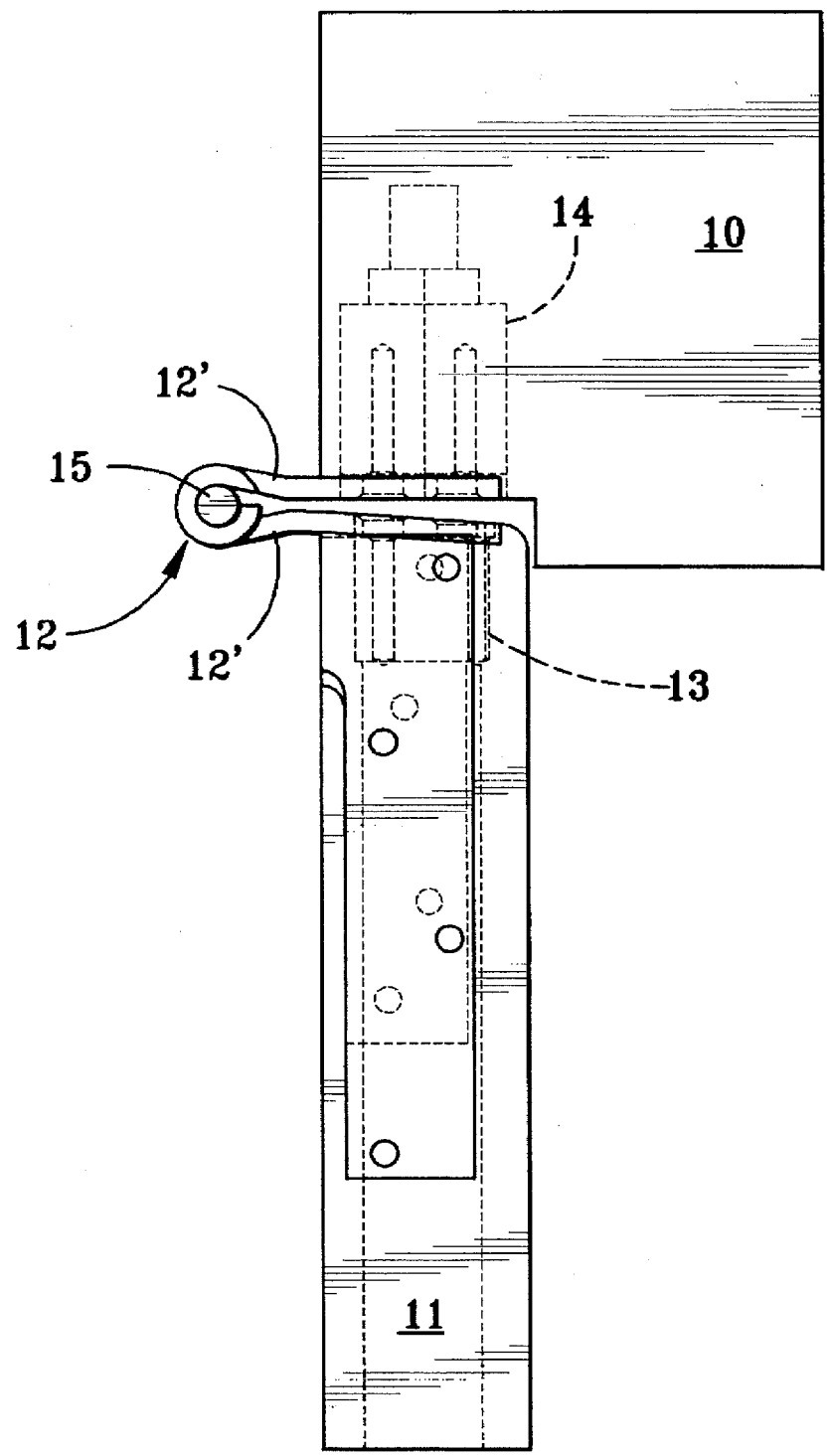
FIG. 1 is a schematic top plan view of a door, mounted on butt hinge plates, in a door frame in the closed position.
Figure 2:
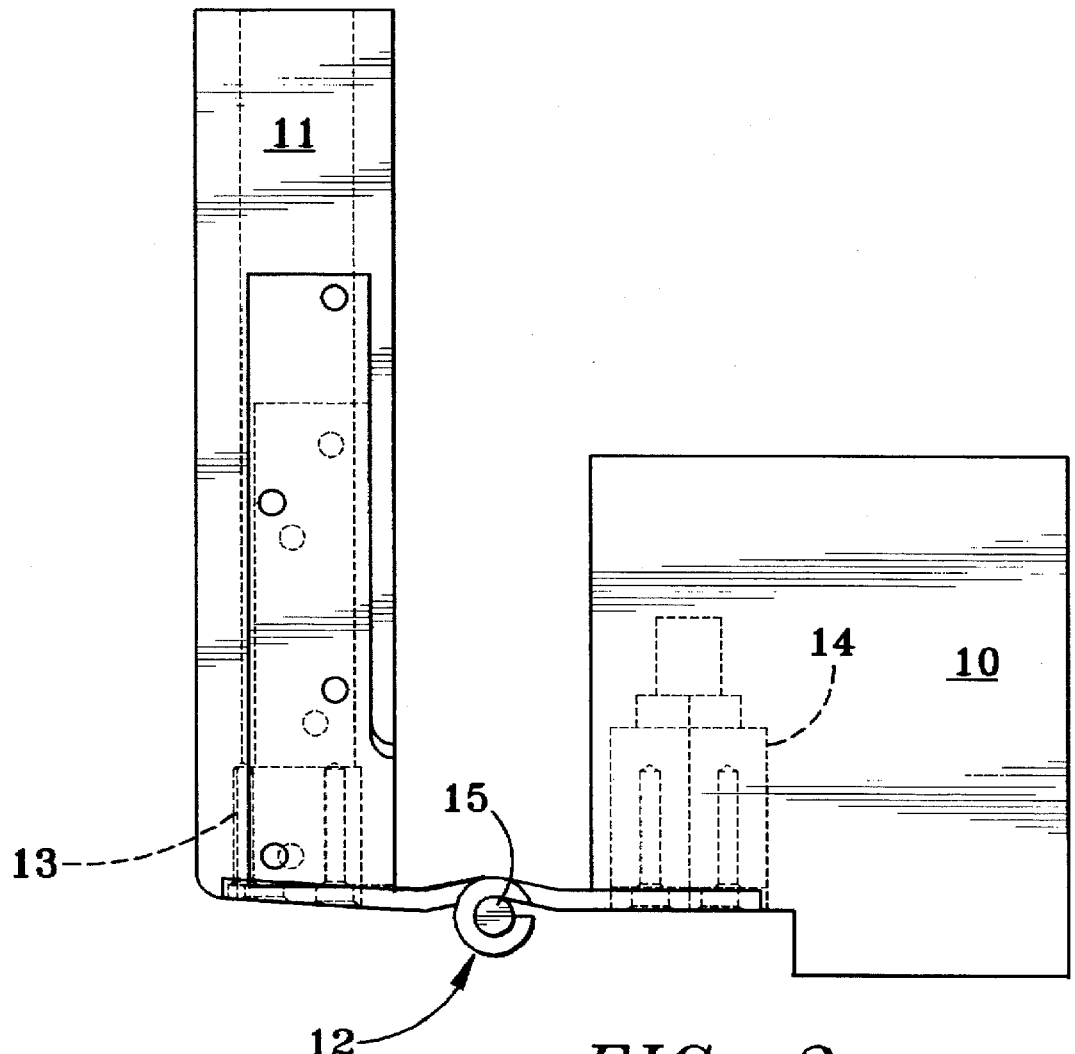
FIG. 2 is a schematic top plan view of the door and door frame of FIG. 1 in the opened position.
Figure 3:
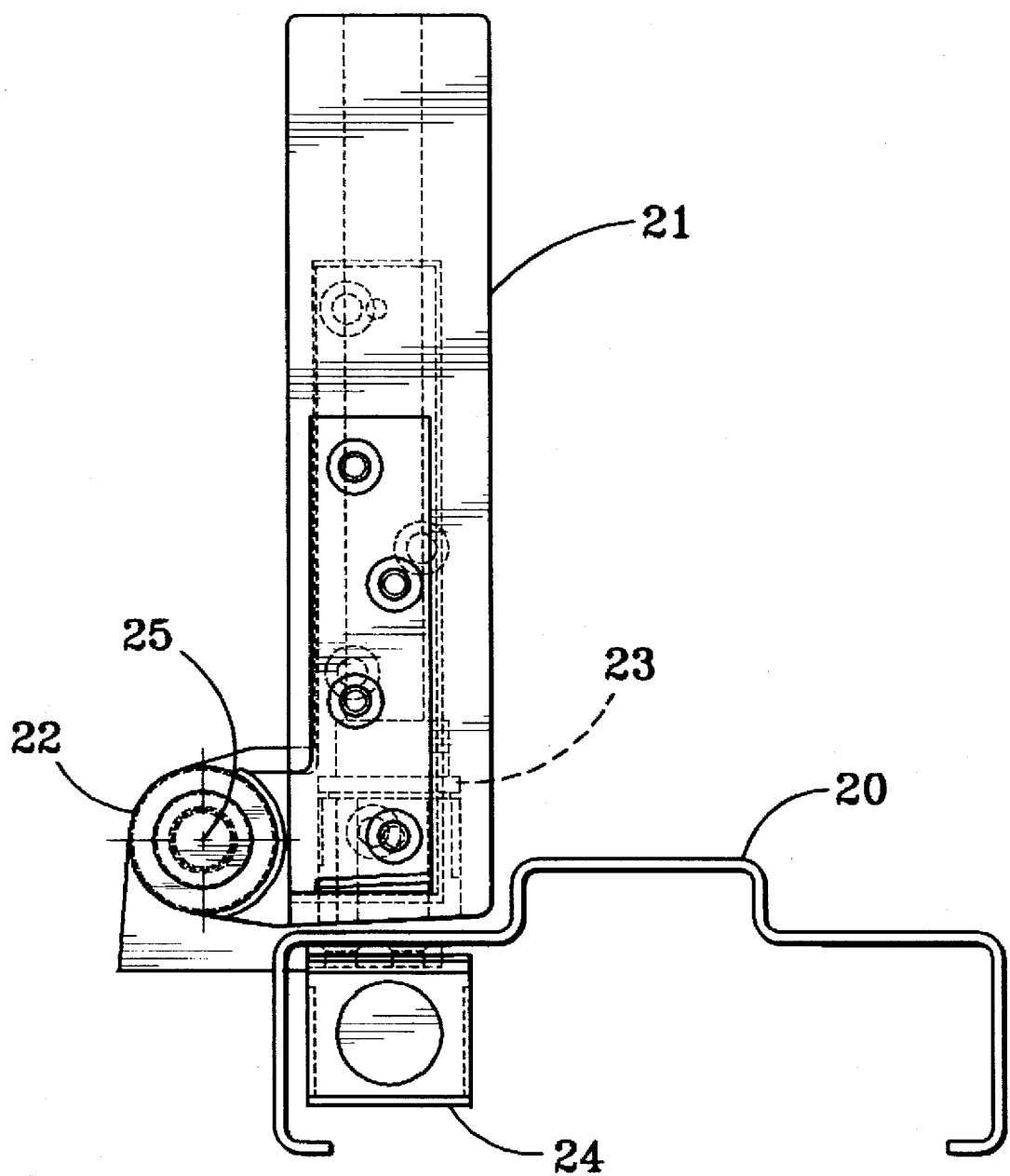
FIG. 3 is a schematic top plan view of a door, mounted on offset pivot hinge plates, in a door frame in the closed position.
Figure 4:
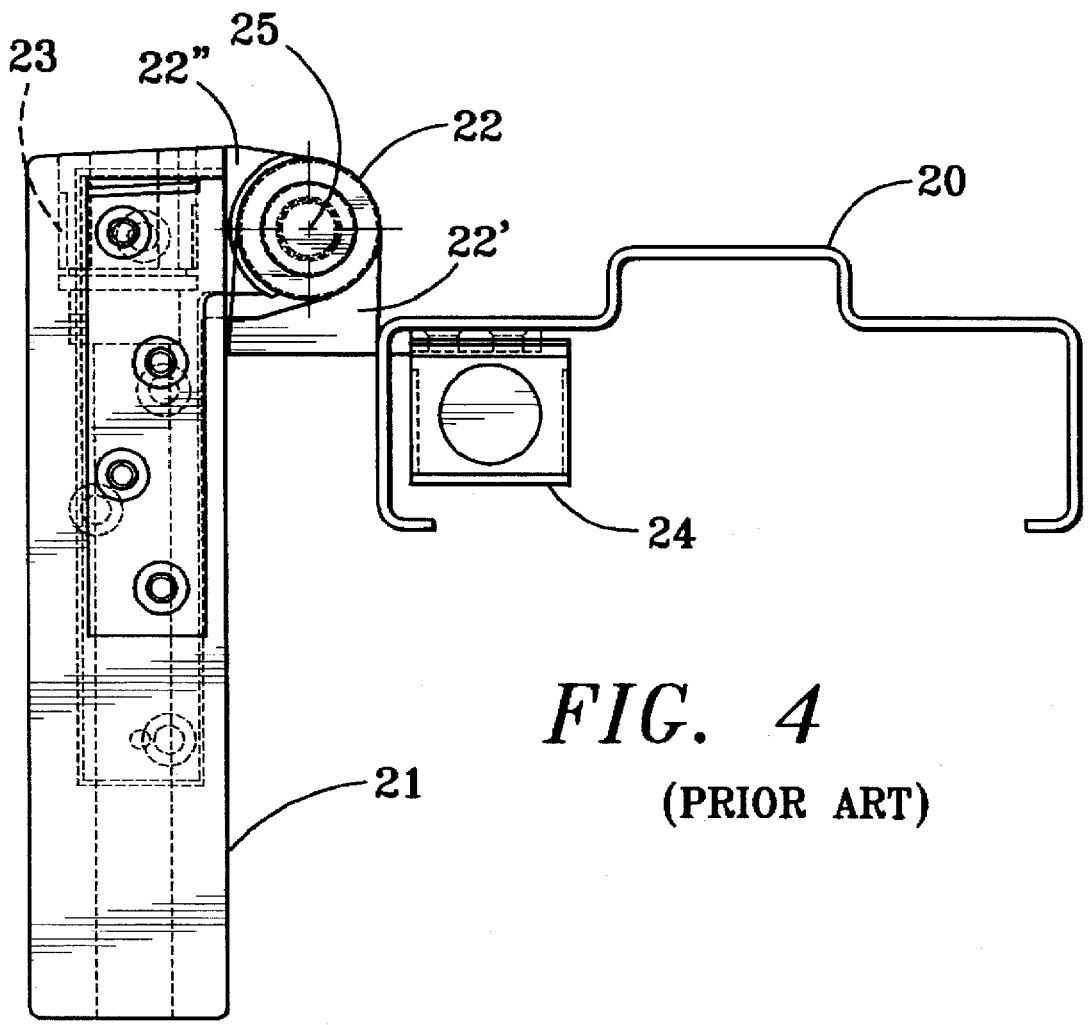
FIG. 4 is a schematic top plan view of the door and door frame of FIG. 3 in the opened position.

FIGS. 1–6 have been discussed with respect to the prior art background of the invention, and no further description is needed.

The invention will be described with reference to FIGS. 7–10, in which the same reference numbers are used in all views in which a feature is visible. The electrical wire, itself, is not shown, for clarity in illustrating the EPT structure. Electrical boxes 23, 24 are mortised into the door 21 and door frame 20, respectively. A housing 144 is installed into each box, such that, when the door is closed, the unit is hidden inside the door and door frame. Each housing 144 has a slot 142, extending substantially the full length of the housing, which allows a 90° elbow 138 to move along the slot longitudinally in the housing 144. The housing has a closed recessed portion 144' at one end of the slot 142 and is open at the other end of the slot. The elbows 138 are inserted through holes in cover plates 140 and then through the slots 142 in the housings and are free to rotate, tilt, and move in and out with respect to the cover plates 140; but they are retained in the holes by flanges, snap rings, or other suitable means. The cover plates 140 are slidably engaged with retainer rails 146 on the backs of the housings 144 so that they can slide along the housing slots 142 at the open ends but are held against the housings to close the slots. The two elbows 138 are connected by a swivel tube 131 which has two threaded caps 136 for threading to the elbows 138. The caps 136 are retained on the tube 131 by flared ends, internal snap rings, or other means which permit rotation of the caps relative to the tube.

Figure 5:
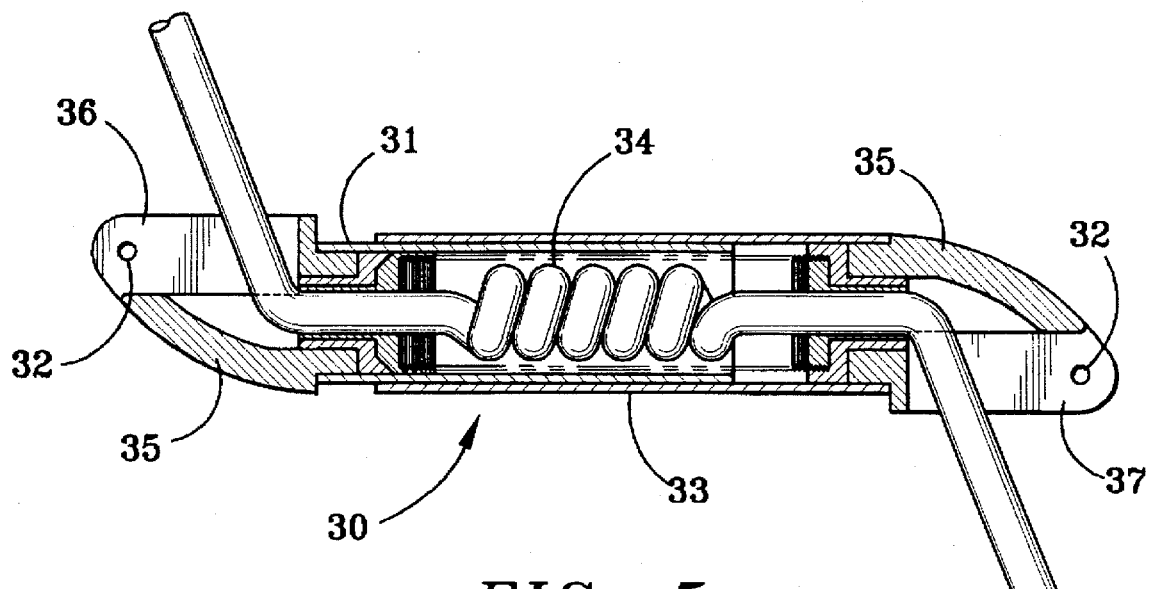
FIG. 5 is a fragmentary schematic partially sectional view of an EPT of the current art showing construction detail.
Figure 6:
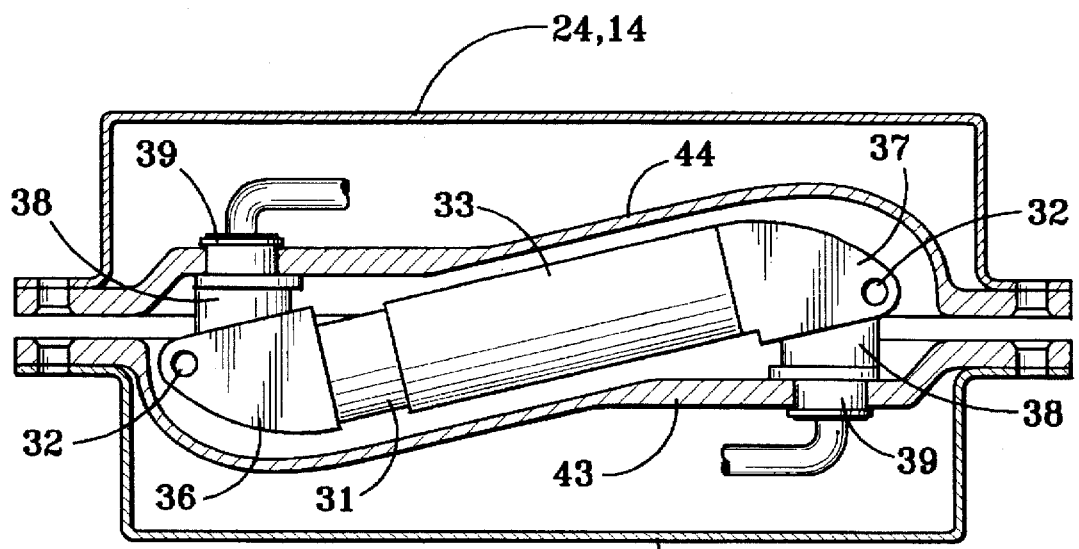
FIG. 6 is a fragmentary schematic partially sectional view of door and door frame mounted electrical boxes containing an EPT of the current art and showing further construction detail.
Figure 7:
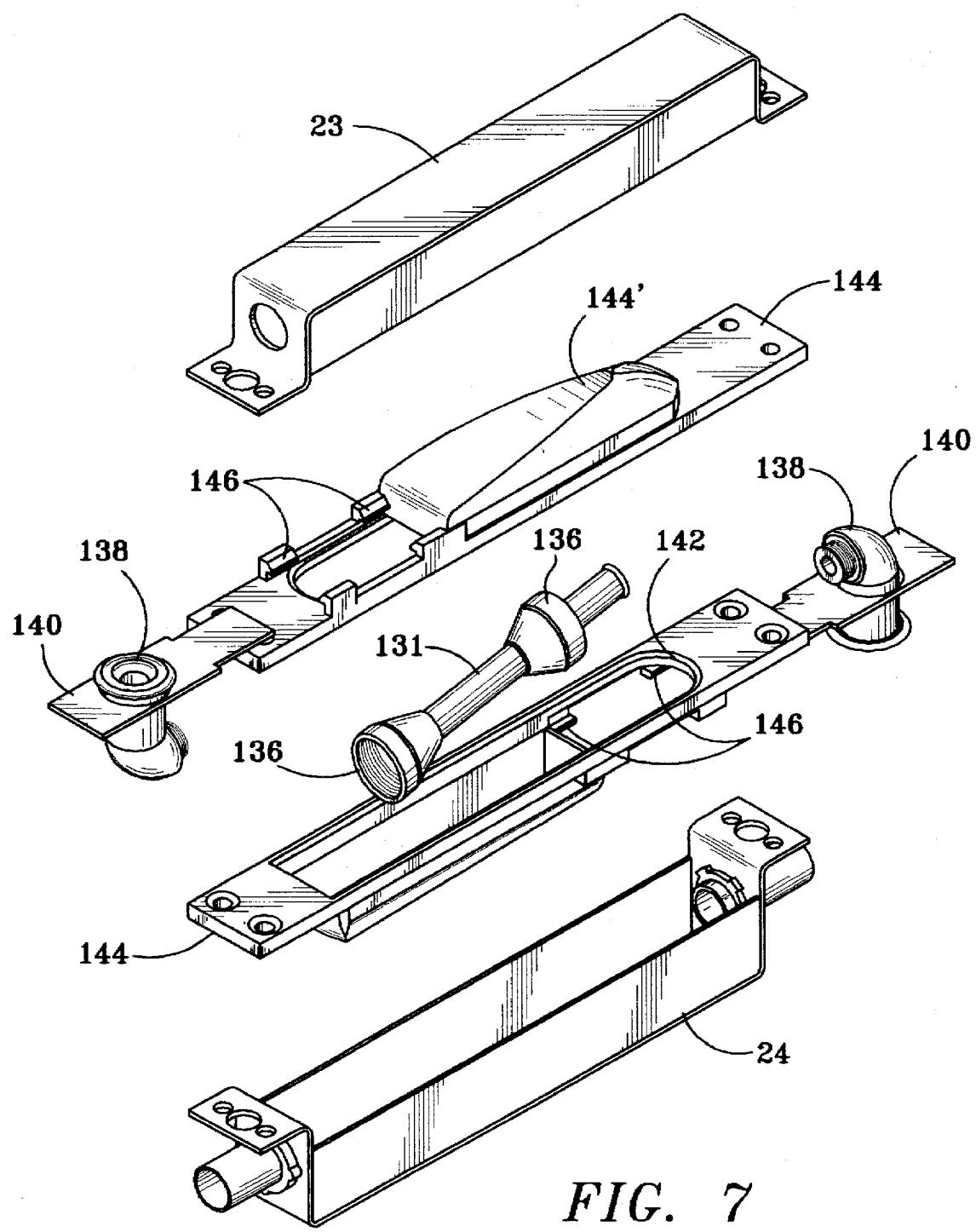
FIG. 7 is an exploded perspective schematic view of a preferred embodiment of an electrical power transfer (EPT) of the present invention.
Figure 8:
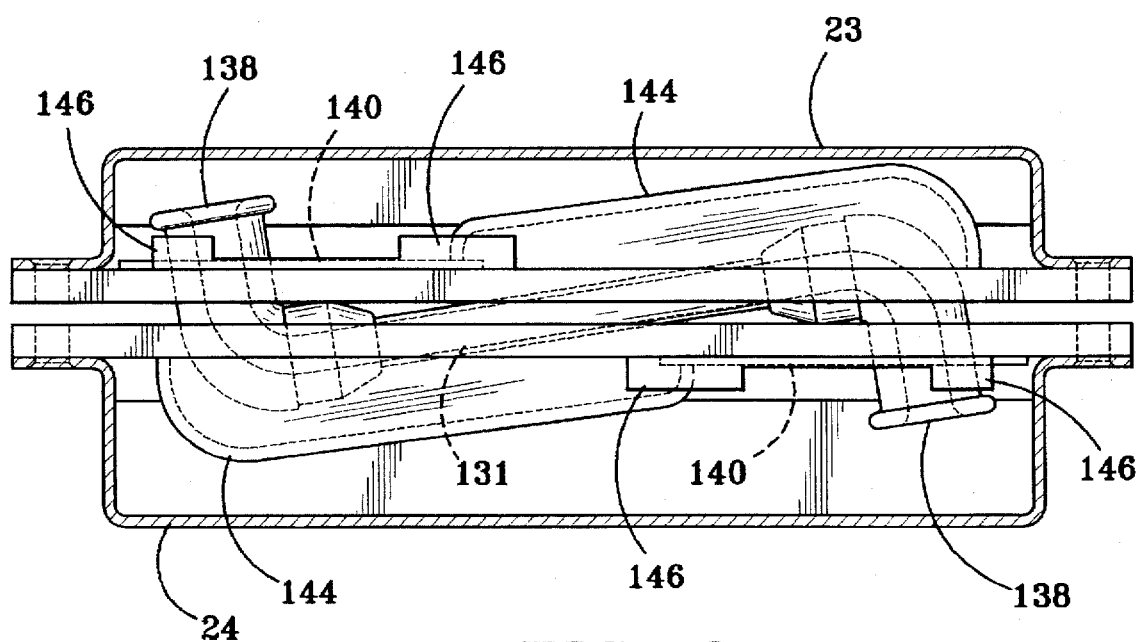
FIG. 8 is a partly sectional side schematic view of the EPT of FIG. 7 in the door-closed position.
Figure 9:
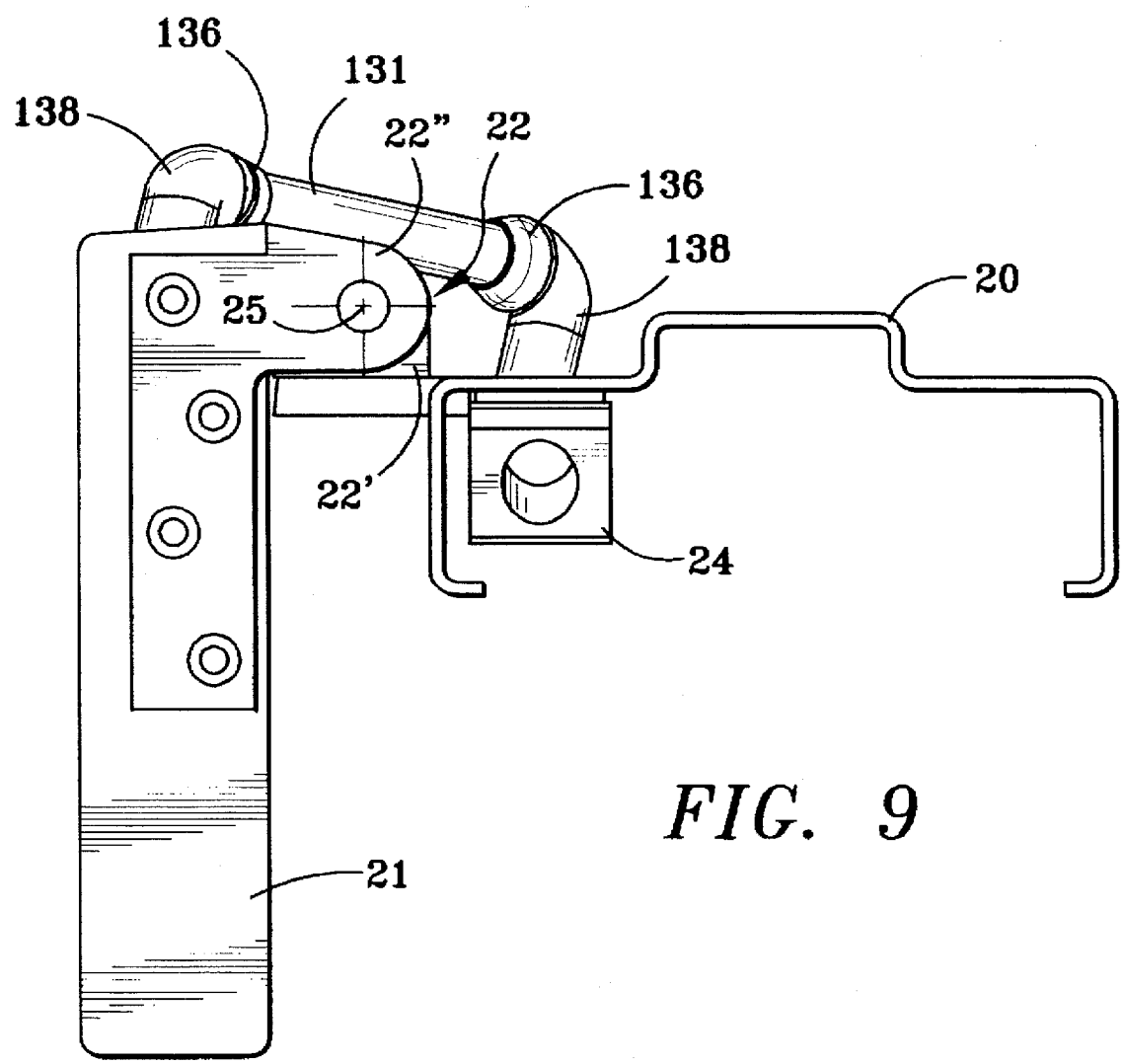
FIG. 9 is a top schematic view of the EPT with the door in the 180° open position.
Figure 10:
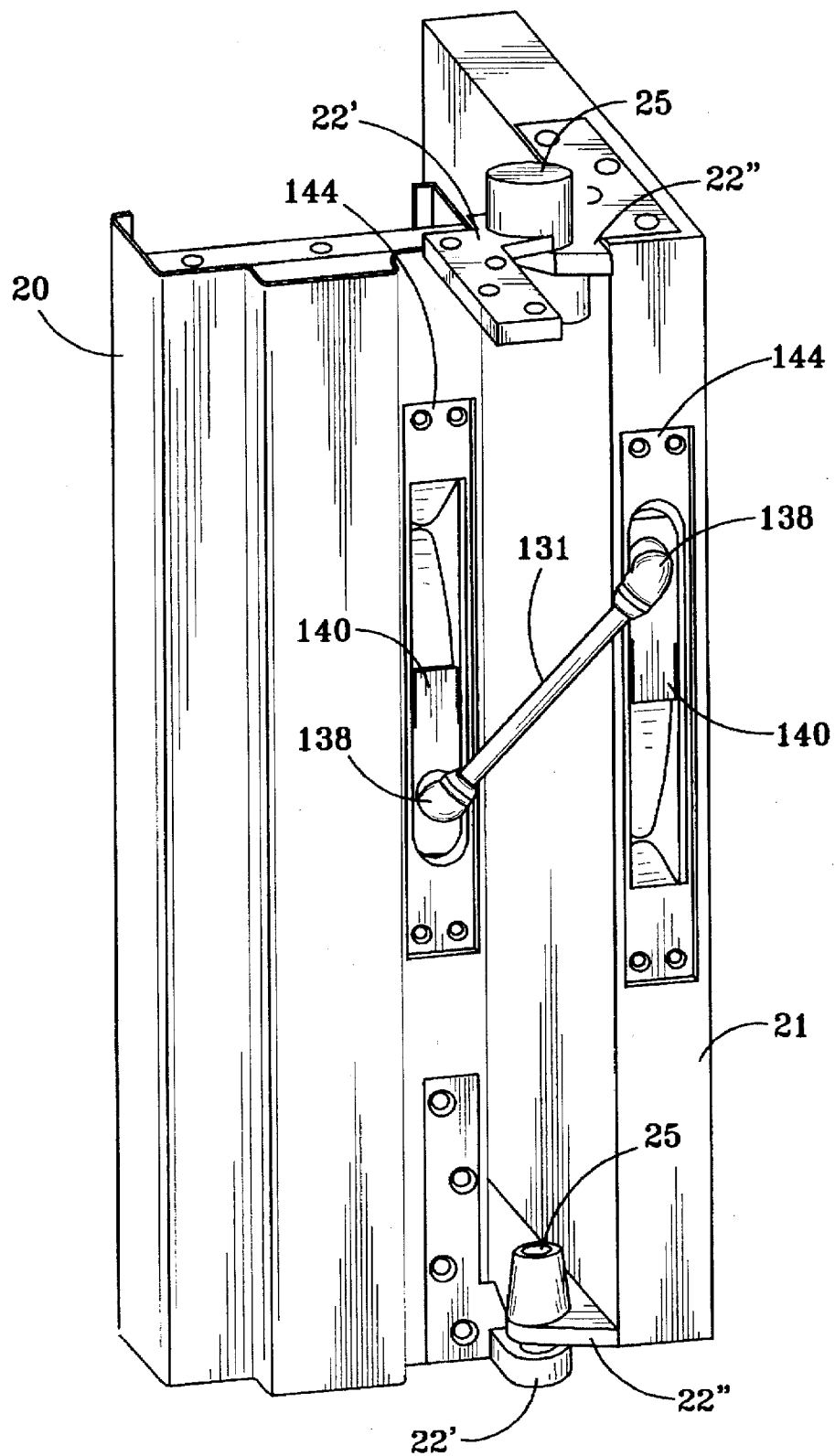
FIG. 10 is a schematic perspective elevation view of the EPT of FIG. 9.

The wire (not shown) from the power source passes through the conduit connector into the frame electrical box 24, into the elbow 138, through the first cap 136, the tube 131, the other cap 136, the elbow 138, into the door electrical box 23, and thence to the electrical door hardware. The elbows 138 float with respect to the cover plates 140 and the housings 144 and are fixedly threaded to the caps 136. The caps 136 swivel with respect to the tube 131, so that there is virtually complete freedom of motion of the elbow 138 in the door 21 with respect to the elbow 138 in the door frame. This arrangement mitigates the fatigue tendency of the wire; because it spreads the flexure of the wire over virtually the entire EPT instead of concentrating it in the EPT as described for the prior art and as shown in FIG. 5. By distributing the flexure over an extended length of wire, the local strain is maintained below the elastic limit for the wire and fatigue damage is virtually eliminated.

Starting with the door 21 closed in the frame 20, the elbows 138 project deeply into the closed recessed portions of the housings 144', and the tube 131 and end caps 136 are angled to align with the cavity inside the two housings 144. The elbows 138 are also pointing in opposite directions from each other. As the door starts to open, the frame elbow 138 is pulled forward away from the frame 20 and is dragged upward toward the top elbow with the cover plate 140 in the housing slot 142 of the frame housing 144. At the same time, the swivel tube 131 assembly allows the door elbow 138 to rotate relative to the bottom (frame) elbow 138. When the door 21 reaches the 180° open position, both elbows 138 are pulled outward from their housings 144 and are facing in the same direction. The frame cover plate 140 has been pulled upward to engage a stop in the frame housing 144, and the door cover plate 140 has been pulled downward to engage a stop in the door housing 144.

In addition to elimination of wire fatigue, this arrangement allows the door 21 to open to 180° with ¾" offset hinge pivots. It does this with an overall length of only 9¹⁄₁₆" for the entire EPT. In addition, the wire is well shielded from mechanical damage.

Having described the invention, I claim:

1. An apparatus for providing an electrical connection from a power source, through a stationary door frame, into a door to connect to door-mounted electrically-operated hardware, comprising:

an electrical junction box installed in a mortise cavity in said door frame adjacent to a similar electrical junction box installed in a mortise cavity in an edge of said door, said junction boxes being adjacent each other when the door is in a closed position;

a housing installed in each junction box, each housing having a longitudinal slot in a face plate thereof of a length substantially equal to the length of the junction box, and a cover plate longitudinally slidably engaged in grooved fingers on a rear surface of said face plate, said cover plate having a substantially circular hole;

a hollow tube having an elbow swivelably mounted on each end, one said elbow floatably engaged in the substantially circular hole of the cover plate of the housing mounted in the door frame and the other said elbow floatably engaged in the substantially circular cover plate of the housing mounted in the door; and a conductor cable connected to a power source, in the junction box mounted in the door frame, extending through said elbows and said hollow tube into the junction box mounted in the door, and connected to leads to door hardware mounted in or on the door.

2. The apparatus for providing an electrical connection according to claim 1, further comprising:
a closed recessed portion in each of said housings extending approximately half the length of said housing slot.

3. The apparatus for providing an electrical connection according to claim 1, wherein said elbows floatably engaged with said cover plates are captured in said cover plates but are free to tilt, to swivel, and to move in and out with respect to said cover plates.

* * * * *